United States Patent [11] 3,599,989

[72] Inventors Henry R. Kruspe;
Norwood Kenneth Perkins, both of Lexington, Ky.
[21] Appl. No. 877,313
[22] Filed Nov. 17, 1969
[45] Patented Aug. 17, 1971
[73] Assignee International Business Machines Corporation
Armonk, N.Y.

[54] MEASURED REVIEW FOR DISC-TYPE DICTATION APPARATUS
10 Claims, 13 Drawing Figs.

[52] U.S. Cl. ........ 274/14, 179/100.1 DR
[51] Int. Cl. ........ G11b 25/04
[50] Field of Search ........ 274/4 H, 13, 14; 179/100.4, 100.1 DR, 100.2

[56] References Cited

UNITED STATES PATENTS 2,452,133 10/1948 Leitner ........ 274/13
2,637,562 5/1953 Balmer ........ 274/14
2,808,268 10/1957 Moore ........ 274/13
2,866,647 12/1958 Sommers ........ 274/14

*Primary Examiner*—Leonard Forman
*Assistant Examiner*—Dennis A. Dearing
*Attorneys*—Hanifin and Jancin and D. Kendall Cooper

ABSTRACT: The invention concerns dictation apparatus making use of disc-type record media for the recording and reproducing of audio signals and particularly concerns mechanisms for effecting a desired standard amount of review of previously dictated material irrespective of the relative location of a sound transducer with respect to the disc. Customarily, in a disc-type apparatus, means are provided for relatively moving a transducer with respect to the disc media to trace a spiral sound track from the outer portion of the disc toward the inner portion. This may result in a variance in the amount of material that is reviewed during each operation of an associated review or backspace mechanism, and the present invention concerns itself with establishing a standardized increment of review in such apparatus.

*INVENTORS*
HENRY R. KRUSPE
N. KENNETH PERKINS
BY D. Kendall Cooper
*ATTORNEY*

MEASURED REVIEW FOR DISC-TYPE DICTATION APPARATUS

BACKGROUND OF INVENTION, FIELD, AND PRIOR ART

The field of the invention lies in disc-type recording and reproducing apparatus wherein means are provided for a transducer to trace a spiral or helical sound track on a disc media when properly positioned in the unit. Ordinarily, apparatus of this nature generally comprises a driving means for rotating the disc media at a predetermined speed and, in some cases, may provide for rotating the media at different speeds depending upon where the transducer is in relation to the media with, as an example, the driving means rotating the media at a lower speed near the outer periphery and at a higher speed when the transducer is toward the center of the media. In a device of this type, besides the means for driving the media, there is normally provided some form of driving means to move the transducer inwardly and outwardly with respect to the center of the disc to thereby trace a helical signal path on the media.

Various kinds of structures have been provided in the prior art for accomplishing a review of previously dictated material on a disc-type media. In one form of prior review apparatus, means have been provided for stepping the transducer on an incremental basis from track to track transversely across the recorded signal path. As is evident, this results in movement of the transducer in relation to the media in such a fashion that a greater amount of signal is traversed near the outer portion of the disc and a lesser amount near the central portion of the disc. Other types of prior art devices have contemplated the provision of reverse driving means so that the transducer traces the signal path in the reverse direction for a selected interval, which again usually results in a variance of the amount of material that is retraced at the periphery of the disc in relation to the central areas of the disc. Some prior devices have avoided the problem of variable review by not having this feature at all.

SUMMARY OF INVENTION

In accordance with the present invention, a standardized measured review is established in a disc-type dictation unit by providing means that insure that the transducer retraces an amount of material that is essentially the same regardless of whether the transducer is near the outer periphery of the disc or near the central portion of the disc. Structurally, the disc apparatus described herein includes driving means for rotating the disc recording media at a desired speed of rotation and further incorporates leadscrew drive means normally engaged with the transducer for relatively moving the transducer, customarily from the outer periphery of the disc inwardly to the central axis of rotation of the disc during normal recording and reproducing operations in a forward direction. As is known in the art, the concurrent rotation of the disc media and the substantially linear movement of the transducer with respect to the disc results in the tracing of a helical signal path on the disc member. Preferably, as the transducer moves from the home location near the outer periphery of the media toward the end location near the central axis, the speed of rotation of the disc is changed in a substantially linear fashion in order that the disc is moving at a slower speed when the transducer is near the outer periphery and at a higher speed when the transducer is nearer the central axis. This insures that the relative movement between the disc media and cooperating transducer is substantially the same, both at the outer periphery of the disc and near the central axis. As an example, the foregoing arrangements may establish a linear motion in the recording track of 1.5 inches per second. The foregoing preferred arrangements enable the storage of a larger amount of material on the same size disc than would be possible if the disc were rotated at a fairly constant rate of rotation throughout the range of scanning of the transducer.

As with any dictation apparatus, it is desirable that the dictator be able to review material that he has just dictated in order to make corrections, indicate instructions, and so on. As previously indicated, problems have been encountered in prior art devices with available review structures since a wide variance exists between the amount of material that the dictator is able to review when the transducer is near the outer periphery of the disc when compared with the amount of material that he is able to review near the central axis of the disc. In accordance with the present invention, a review mechanism is provided that cooperates with the disc-driving structures in such a manner that a comparable distance is retraced along the signal track irrespective of whether the transducer is near the outer periphery of the disc or near the central axis. Since it is desirable that the review mechanisms operate directly on the disc-driving means and rotate the disc in a direction opposite to that in which it is normally rotated, it is contemplated by the present invention that in order to insure the retracing of a comparable track distance, the disc be rotated a first predetermined, angular distance when the transducer is near the outer periphery of the disc and a second predetermined angular distance when the transducer is near the central axis of the disc that may comprise as much as twice the first-mentioned angular distance. In the particular form of the apparatus described herein, means engaged with the disc serves to concurrently move the transducer during the retracing of the signal path when a review operation is effected in order that the transducer remains synchronized with the signal path on the disc. The device according to the present invention utilizes the present location of the transducer whether inwardly or outwardly located with respect to the axis of the disc media to control the extent of driving action of the review mechanisms with linkages that are movable a relatively greater distance when the transducer is closer to the axis of the disc and a relatively shorter distance when the transducer is near the periphery of the disc.

OBJECTS

An object of the present invention is to provide a standardized measured review for a disc-type dictation apparatus.

Another object of the invention is to provide a feature of this type that may be variably set to insure a predetermined amount of measured review at the periphery and the interior of the disc media.

Still another object of the present invention is to provide measured review for dictation apparatus utilizing disc-type record media that is formed of structures cooperating in a simplified manner with the main driving structures of the apparatus.

A still further object of the present invention is to provide measured review structures that are coupled with mode-control structures to establish a more simplified operation of the device. In the device disclosed herein, the review control is conveniently integrated with the off-listen control mechanisms.

The foregoing and other objects, features, and advantages of the invention will be apparent from the following more particular description of a preferred embodiment of the invention as illustrated in the accompanying drawings.

DETAILED DESCRIPTION OF INVENTION

Figure 1:
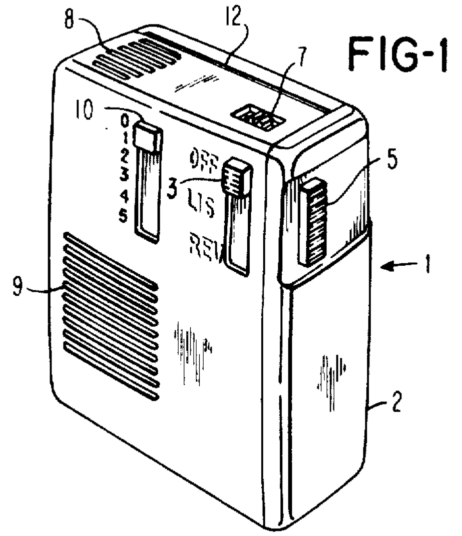
FIG. 1 is a right front perspective view of dictation apparatus incorporating measured review structures according to the present invention.
Figure 2:
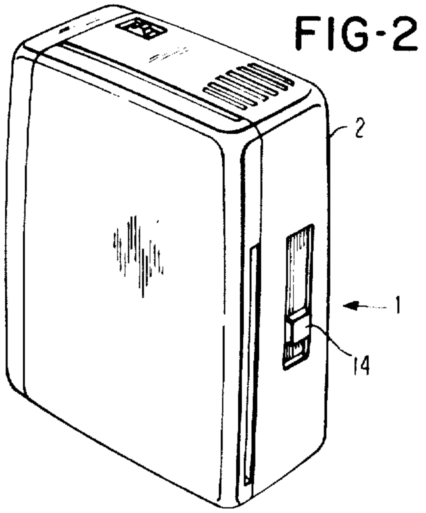
FIG. 2 is a right rear perspective view of the dictation apparatus of FIG. 1.

FIGS. 1 and 2 illustrate a disc-type recording apparatus that incorporates the measured review structures according to the present invention. Dictation apparatus 1 includes a housing 2 that encompasses the various mechanisms required for recording and reproducing of signals. Some of the features of the apparatus that are of interest include an Off-Listen-Review slide 3 shown on the front side of the unit that establishes an Off condition of the apparatus, a Listen (playback) condition, and a measured Review operation, respectively. The dictation apparatus also includes dictate bar 5 that is depressed to establish a Record mode in the unit. This is customarily interlocked with the Off-Listen-Review slide 3 so that dictate bar 5 is operable only when slider 3 is in the Off position. The unit also includes a volume control 7 for controlling the volume level during playback. On the top surface of the unit is a microphone 8, and on the front is a speaker 9. Provided near the top center portion of the front panel is a scan lever 10 that is movable in a range designated "0" through "5," representative of the starting position of recording or playback as the case may be and up to 5 minutes' worth of dictated material. On the upper surface of the dictation apparatus is a slot 12 adapted for receiving disc media manually loaded and ejected by the operator. The unit may further incorporate structures controlled by a control button 14, FIG. 2, for automatically loading new discs internally in the unit. The ejection of a disc media, once a recording has been made thereon, is accomplished ordinarily by movement of the scan lever 10 to its extreme upward position in FIG. 1.

Internal Assemblies

Figures 3A, 3B:
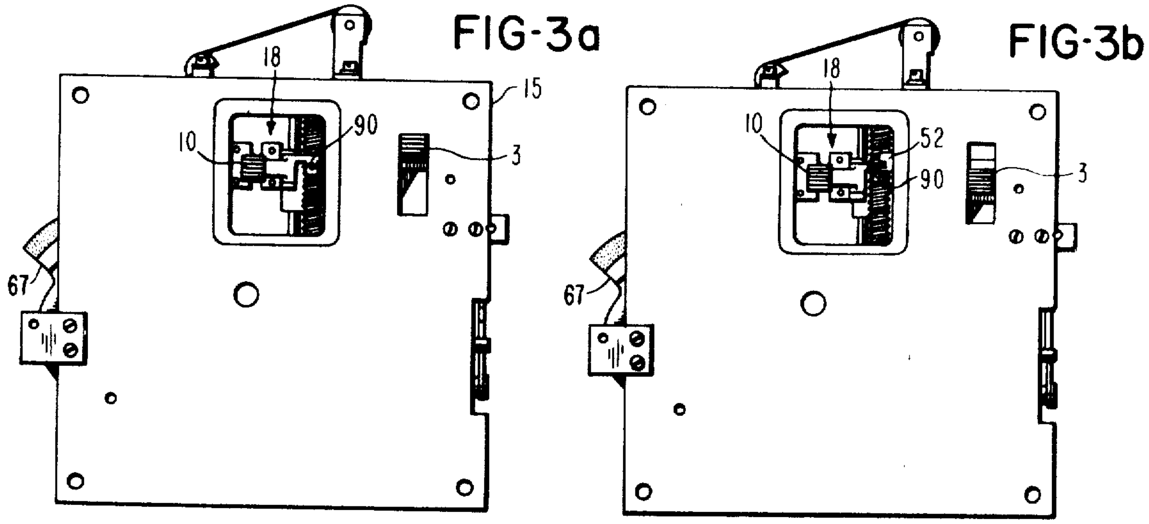
FIGS. 3*a* and 3*b* illustrate internal frame and assembly members, particularly showing stopping means that are related to the measured review function and that determine the extent of movement of various elements incorporated therein.

The other figures in the present case illustrate various internal assemblies for driving a disc media, driving the transducer relative to the media, and for effecting in particular the measured review in accordance with the present invention. FIGS. 3a and 3b illustrate the primary supporting frame 15 that accommodates most of the mechanisms required in the apparatus. Some of the features previously described are shown in FIGS. 3a and 3b. This includes, as an example, the Off-Listen-Review slide 3, and scan lever 10. As may be seen in FIGS. 3a and 3b, scan lever 10 is associated with a head carrier 18 that mounts the magnetic sound head transducer more particularly shown in FIGS. 5a, 5b, and 5c, designated 20. Reference is also made to FIGS. 4a—4d for various elements involved in the driving of the disc media, the transducer, and the measured review structures. FIGS. 3a and 3b will be referred to more particularly at a later time in connection with the measured review operation. Referring now to FIGS. 4a—4d, and especially to FIG. 4c, the primary motive power is provided by a motor 25 operating through drive means generally indicated at 26 with the ultimate objective of driving the disc media when properly positioned in the unit. A disc media 30 is shown in dashed form in FIG. 4c. When properly positioned in the unit on spindle 33 and engaged with pin 34, disc 30 is driven by drive means 26 concurrently with a worm gear 38 with synchronism maintained through worm drive means 36. Drive means 26 output is through shaft 27 and gear box 32. Worm gear 38 is affixed to one end of a lead screw shaft 40 that may best be seen in FIG. 4d. Head carrier 18 is provided with a pawl element that is pivotally mounted on the head carrier 18 for engagement and disengagement with lead screw 40 under control of scan lever 10. As is customary in dictation apparatus, head carrier 18 may be disengaged for movement as desired by the dictator for an extended distance in relation to the disc media.

With the driving arrangements just described, disc 30 is rotated as dictation or playback of signals proceeds; and due to the interconnection of leadscrew 40 with the driving means, transducer 20 is relatively moved from the outer periphery of disc 30 toward the central axis of spindle 33 to trace a helical signal path on disc 30. The mode of operation of the dictation apparatus is established by appropriate movement of the Off-Listen-Review slide 3 in conjunction with dictate bar 5. That is, in order to dictate material, the user positions slide 3 to the "Off" position, thereafter depresses dictate bar 5, and proceeds to dictate material into microphone 8. To listen to a previously recorded disc, slide 3 is moved to the Listen position which results in the relative driving of the disc and the transducer to retrace the previously recorded path in order to reproduce signals. Ordinarily, the dictator wishes to review previously dictated material while he is in the process of recording a particular disc. Accordingly, his action will be to move slide 3 from the Off position to the Review position which effects a measured review as will shortly be described in connection with FIGS. 5a, 5b, and 5c. Slide 3 is spring loaded so that it must be held in the Review position and, upon release by the dictator, automatically moves back to the Listen position for the dictator to listen to signals on the disc from speaker 9.

Detailed Operation of Measured Review Feature

Figure 5A:
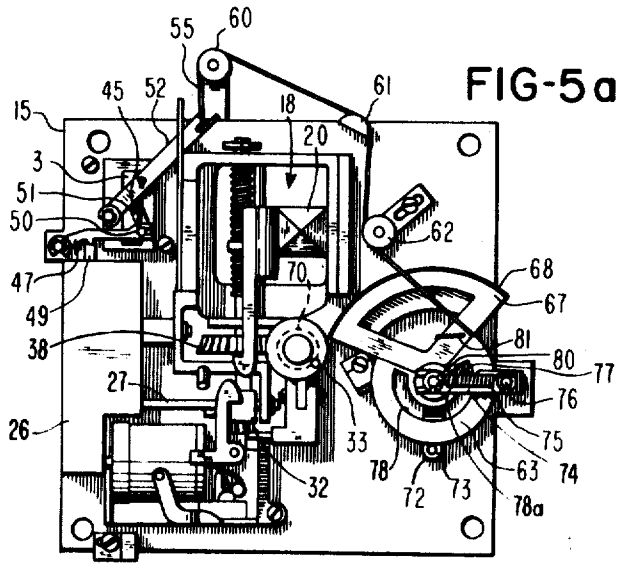
FIGS. 5a, 5b, and 5c, when taken together, represent a sequence of events during movement of a review-control slide on the front of the dictation apparatus shown in FIG. 1 and particularly showing the primary structures involved in effecting a measured review.
Figures 5B, 5C:
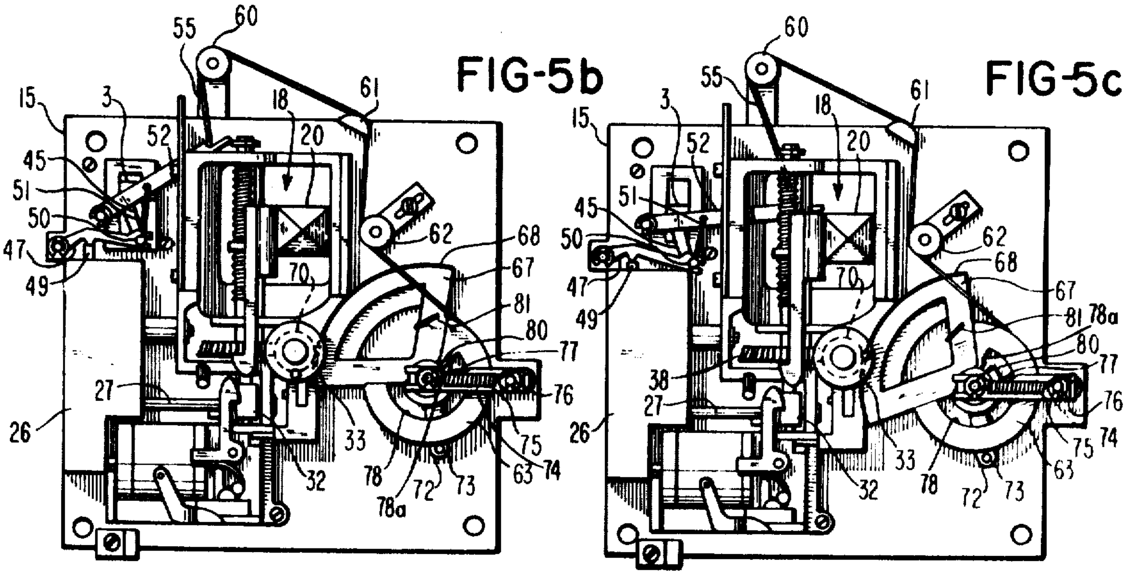
Figures 6, 7:
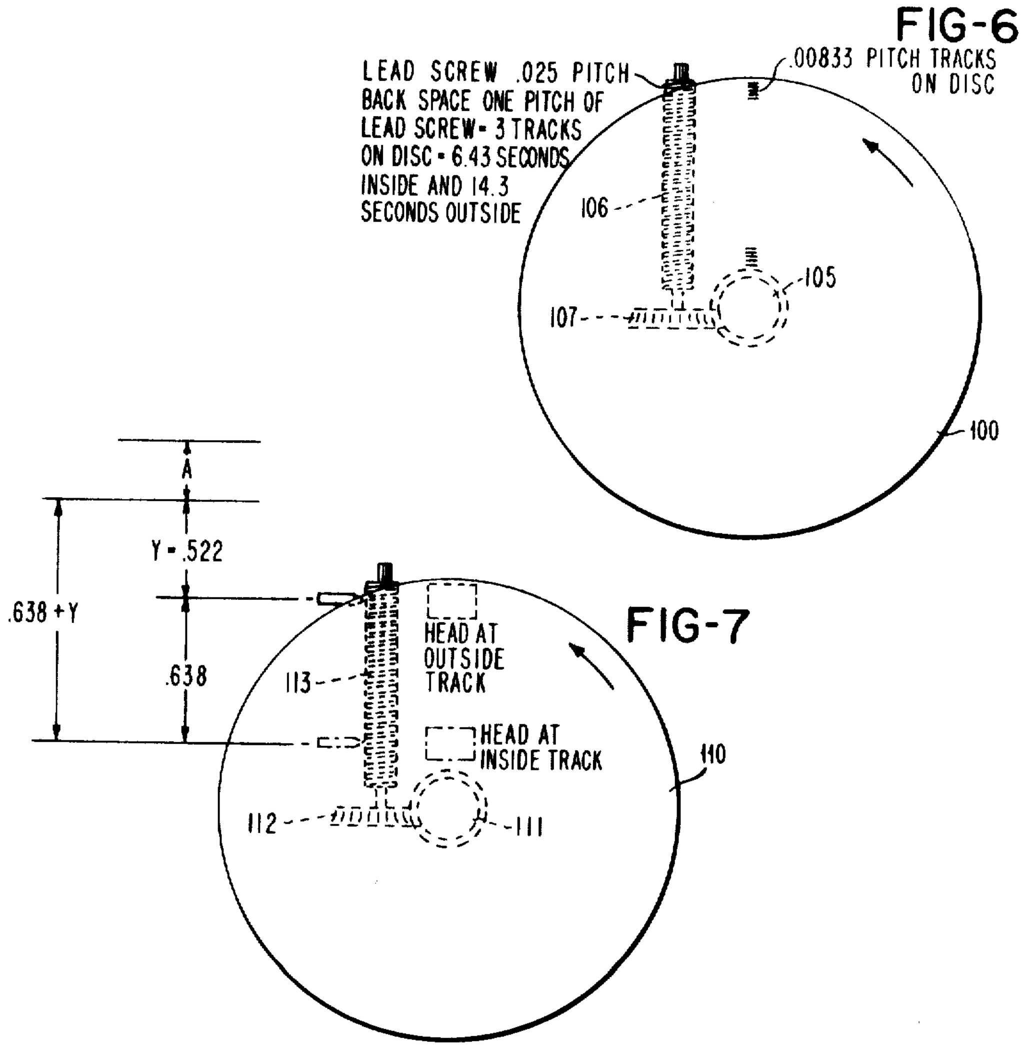
FIG. 6 illustrates certain of the difficulties present with some prior art structures, particularly with respect to the variance in review that occurs in such prior devices.
FIG. 7 is related to the structures previously illustrated for the present apparatus and sets forth some of the basic considerations in establishing a standardized measured review with a disc-type media.

The measured review feature of the dictation apparatus may best be understood by reference to FIGS. 5a, 5b, and 5c that illustrate a sequence of movement of various elements involved in the review operation as well as FIGS. 6 and 7 that illustrate the prior art and the present inventive arrangements, respectively.

Referring to FIGS. 5a, 5b, and 5c first, the measured review structures are primarily under control of slide 3 that is shown mounted for sliding movement on the underneath side of frame 15. Slide 3 includes member 45, extending at an angular direction with respect to the line of movement of slide 3. Slide 3 essentially moves in a vertically oriented path from an uppermost position shown at FIG. 5a to a lowermost position shown in FIG. 5c.

Extension 45 of slide 3 engages a drive disengaging link 47 in such a manner that movement of slide 3 downwardly also moves link 47 downwardly into engagement with an extension 49 to disengage the driving means 26 from leadscrew 40 and disc 30.

Coupled by pin 50 on extension 45 is a link 51 connected to a review-measuring lever 52 in such a manner that movement of slide 3 downwardly also effects movement of measuring lever 52 in a downward direction. Attached to the uppermost extremity of measuring lever 52 is a pull cord 55 mounted in a prescribed manner about pulleys 60, 61, and 62 for ultimate driving attachment to a pulley sector 63, The various pulleys 60, 61, and 62 are mounted in an appropriate fashion by associated bracket members supported by frame 15.

Figure 4A:
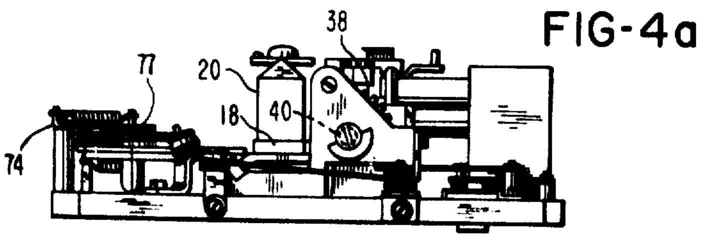
FIGS. 4a, 4b, 4c, and 4d represent various elevations of the assembly shown previously in FIGS. 3a and 3b, particularly illustrating various elements and members involved in the rotation of a disc media, the recording and reproducing of signals, and the establishment of a measured review.
Figure 4B:
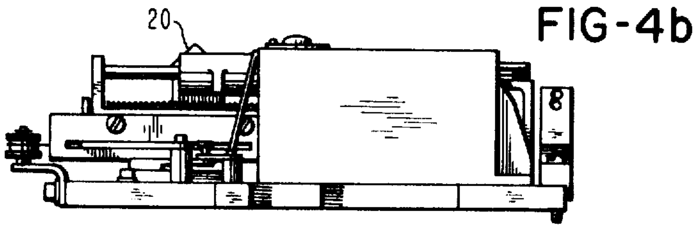
Figure 4C:
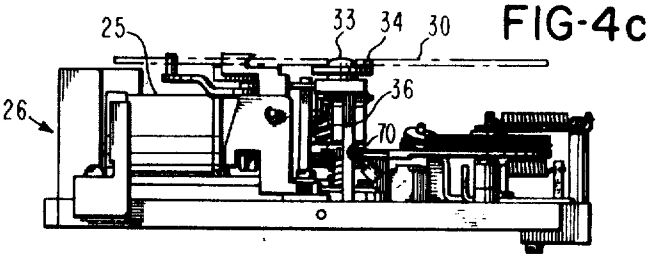
Figure 4D:
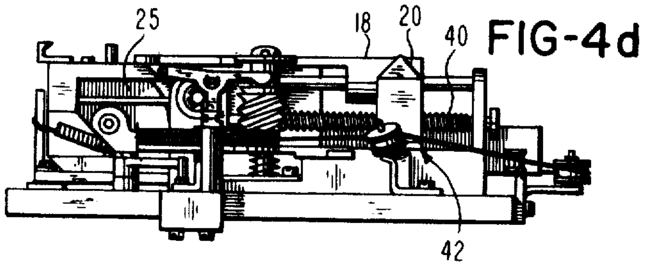

Associated with pulley sector 63 is a friction sector 67 carrying a band of frictional material 68 that is intended for driving engagement with a serrated wheel 70, concentrically mounted with spindle 33 as may best be seen in FIG. 4c. The sector elements 63 and 67 are mounted for pivotal movement on a supporting arm 72 in turn supported by a stud 73. Interconnecting the central axis of pulley sector 63 is a spring member 75 connected to an upright post 76 that is fixedly mounted on frame 15. Spring 75 exerts a resilient force on the sector 63 and 67 elements tending to keep them in a restored condition.

Besides being mounted for pivotal movement on arm 72, sector 63 and associated friction sector 67 are mounted on shaft 80 for rotary movement during operation of the measured-review structures. A restore spring 81 insures that the sectors 63 and 67 return to a clockwise restored condition on pin 80 as also shown in FIG. 5a.

Arm 74 and latch 77 which is part of arm 74 is a fixed member relative to frame 15. Arm 74 is slotted at its left-hand extremity. The annular opening 78 in sector 63 is notched at 78a to accept latch 77 when sector 63 is at home position as shown in FIG. 5a.

In order to operate the measured review mechanisms, the user of the dictation apparatus moves slide 3 downwardly from the condition shown in FIG. 3a (as well as in FIG. 1) to the review position. Referring to FIGS. 5a, 5b, and 5c, movement of slide 3 downwardly operates various mechanisms concerned with disengaging the drive means in the unit as previously described but more specifically moves the measuring lever 52 downwardly. This, in turn, moves pull cord 55 about pulleys 60, 61, and 62 to exert a driving force on pulley sector 63 and associated friction sector 67. The initial condition of the measured review mechanism is shown particularly in FIG. 5a with the sectors 63 and 67 in a restored position that is in a generally clockwise location with respect to the other mechanisms in the unit. The initial action of the measured review mechanisms include a counterclockwise movement of pulley sector 63 and friction sector 67 to position these elements more closely to the serrated wheel 70 in readiness for a measured review operation. Accordingly, during the initial phase of the measured review operation, the measured review sectors 63 and 67 are simply moved on arm 72 away from the restored position shown in FIG. 5a into a "ready" condition shown in FIG. 5b, in readiness for the measured review action. Sectors 63 and 67 are restrained from rotating about pivot 80 during the initial pull on cord 55 due to latch 77 being interlocked with notch 78a in annular opening 78 in sector 63. After supporting arm 72 moves counterclockwise a sufficient distance to release sector 63 from latch 77, sectors 63 and 67 rotate counterclockwise about pivot pin 80. As previously indicated, the movement of disengaging link 47 disengages the disc drive means. About the time that sector 67 moves into the position shown in FIG. 5b, friction element 68 engages serrated wheel 70. Continued downward movement of measuring lever 52 operates to thereafter impart a rotary movement to pulley sector 63 and thereby the associated friction sector 67. The continued movement of measuring lever 52 downwardly imparts a continuing rotary movement of friction sector 67, now engaged with serrated wheel 70, and thereby rotates spindle 33 in a clockwise direction which imparts a reverse movement of disc 30 a desired amount, as will be explained shortly.

As indicated previously in the description of the present apparatus, means are provided associated with the transducer for controlling the extent of the rotary movement imparted to disc 30 depending upon the relative location of transducer 20 with respect to disc 30. Such means is in the form of a pin 90 mounted on carrier 18 and positioned, as may be seen in FIGS. 3a and 3b, for stopping engagement with respect to measuring lever 52.

Accordingly, with the foregoing arrangements, if transducer 20 is located near the outer periphery of disc 30, which in the case of FIGS. 5a. 5b, and 5c is in an upward direction with respect to spindle 33, a smaller angular rotation of disc 30 will be effected than if transducer 20 is positioned closer to spindle 33, that is, near the center of disc 30. This is due to the fact that measuring lever 52 will encounter pin 90 quite a bit earlier if transducer 20 and associated carrier 18 are located in the uppermost position in FIGS. 5a, 5b, and 5c than it will if transducer 20 is located in the downward position in FIGS. 5a, 5b, and 5c.

The effect of such restraining action on lever 52 is to control the extent of driving engagement of friction sector 67 and friction means 68 on serrated wheel 33 and, consequently, the extent of rotation of disc 30. In a typical case, for instance, the disc 30 is moved an angular extent amounting to perhaps 300° when transducer 20 is positioned near the outer periphery of disc 30 while disc 30 is rotated a sum total of 665° when transducer is located closer to the central axis of rotation of disc 30. It is understood, of course, that the foregoing are simply exemplary ranges of movement of disc 30 under the circumstances indicated.

Some of the fundamental difficulties encountered in prior devices may be best understood by reference to FIG. 6. FIG. 6 shows a disc 100 mounted for rotary movement with worm 105 and lead screw 106 due to engagement with worm gear 107. With a prior device of this nature, means are provided for moving the transducer in an incremental, step-by-step fashion into and out of engagement with the individual teeth of lead screw 106. If lead screw 106 has a pitch of 0.025 inches between successive teeth, such incremental movement of a transducer with respect to lead screw 106 will effect a relative movement of the transducer that encompasses a greater amount of dictated material near the outer periphery of disc 100 than it will when the transducer is physically located closer to the axis of rotation of disc 100. As an example, the step-by-step movement of a transducer with such an arrangement may provide approximately 6.43 seconds of dictated material for review when the transducer is close to the axis of rotation of disc 100 and as much as 14.3 seconds of material when the transducer is located near the outer periphery of disc 100.

Reference is now made to FIG. 7 that illustrates some operating fundamentals with respect to the measured review structures disclosed herein, particularly in connection with FIGS. 5a, 5b, and 5c. FIG. 7 illustrates a disc 110 mounted for rotation with a worm 111 that, in turn, is engaged with worm gear 112 affixed for rotary driving action with respect to lead screw 113. The figure illustrates some of the parameters of various linkages in the measured review apparatus, particularly the measuring lever 52 shown in FIGS. 5a—5c. Some movement of lever 52 during interval A, FIG. 7, is initially required to effect the disengagement of the driving means as previously described. Also, during interval A, the sectors 63 and 67 are moved into a driving relationship with respect to serrated wheel 70 in readiness for the measured review operation. When a transducer in the unit is close to the outside track on disc 110, movement of the measuring lever 52 about 0.522 inches will effect the desired amount of rotary movement of disc 110 by the structures previously discussed in connection with FIGS. 5a—5c to establish the predetermined review interval which, in this case, is approximately 4 seconds of material. Movement of lever 52, when transducer 20 is closer to the central axis of rotation of disc 110 by an additional amount approximating 0.638 inches will achieve rotation of disc 110 to an extent necessary to establish a comparable review interval, that is, approximately 4 seconds of material.

While the invention has been particularly shown and described with reference to a preferred embodiment, it will be understood by those skilled in the art that various changes in format and detail may be made without departing from the spirit and scope of the invention.

What we claim is:

1. Dictation apparatus with facilities for transducing signals in conjunction with a disc record media, comprising:

transducing means for transducing signals on a said disc media, means mounting said transducing means and said disc media for relative rotary movement in a preferred direction for transducing operations;

means interconnecting said transducing means and said disc media for synchronized relative movement to trace a helical path on said disc media between its periphery and its axis, said path comprising successive tracks, each corresponding to 360° angular movement of said disc media, the arrangement being such that a track near the periphery of said media comprises a first measured amount of signals while a track near the axis of said media comprises a measured amount of signals significantly shorter than said first measured amount; and measured review means for relatively moving said transducing means and said disc media a predetermined angular distance in a direction opposite to said preferred direction when said transducing means is near the outer periphery of said disc media and an angular distance that is proportionally related to said predetermined angular distance and progessively greater the nearer said transducing means is to the axis of said disc media in order to establish review intervals that are of substantially comparable duration throughout the range of relative movement of said transducing means and said disc media.

2. The apparatus of claim 1, further comprising:

primary motive means for driving said transducing means and said disc media in said preferred direction; and disconnect means operated concurrently with operation of said measured review means and under control thereof for disconnecting said primary motive means from said transducing means and said media to enable relative movement of said transducing means and said media in said opposite direction to the extent required to retrace said helical path.

3. The apparatus of claim 2, further comprising:

unitary control means for activating said measured review means under operator control as circumstances may require.

4. The apparatus of claim 1, wherein:

said significantly shorter measured amount is in the range of one-half of said first measured amount of signals; and wherein said measured review means is operable when activated to relatively move said transducing means and said media a predetermined angular distance to effect retracing of said helical path an extent sufficient to encompass said first measured amount when said transducing means is near the outer periphery of said disc media, and including means further operable to relatively move said transducing means and said disc media progressively greater angular distances approximating double said predetermined angular distance as said transducing means approaches the axis of said disc media during relative movement.

5. The apparatus of claim 1, further comprising:

stop means associated with said transducing means and movable as relative movement between said transducing means and said disc media occurs; and measuring means included in said measured review means and positioned for cooperative engagement with said stop means to control activation of said measured review means in a range of movement that is directly related to and measured by the relative location of said transducing means with respect to said disc media.

6. The apparatus of claim 5, further comprising:

slide means positioned for convenient operation by the user of said apparatus and movable in a linear path between a home position and a review position, said slide means being interconnected with said measured review means to activate the same each time said slide means is moved from said home position to said review position;

spindle means mounting said disc media for rotary movement in said preferred direction and in a direction opposite the said preferred direction;

serrated means concentrically arranged with said spindle means on a common shaft;

lead screw means;

gear means interconnecting said spindle means and said lead screw means for synchronized movement during operation of said apparatus;

friction means incorporated in said measured review means, said friction means mounted for engagement with said serrated means; and means comprising a cord-and-pulley system interconnected with said slide means and operable through a range of movement dependent upon the relative location of said transducing means with respect to said disc media to move said friction means into driving engagement with said serrated means and hence said spindle means and said lead screw means upon each activation of said slide means.

7. The apparatus of claim 6, further comprising:

means associated with said transducing means for indicating the relative location of said transducing means with respect to said disc media; and measuring lever means connected with said slide means to control the extent of engagement of said friction means in dependence upon the condition of said indicating means during each activation of said slide means.

8. The apparatus of claim 7, further comprising:

means mounting said friction means for an increment of disengaged movement occurring just prior to engagement of said friction means with said serrated means during each activation of said measured review means.

9. The apparatus of claim 8, further comprising:

means mounting said friction means for rotary movement at one end of a pivoting member;

means mounting the opposite end of said pivoting member for pivoting movement; and means operable during each operation of said measured review means for pivotally moving said friction means during the initial interval of disengagement, and further moving said friction means in a rotary fashion during engagement with said serrated means.

10. Dictation apparatus with facilities for transducing signals in conjunction with a record media, comprising:

transducing means for transducing signals on a said media;

means mounting said transducing means and said media for relative movement in a preferred direction for transducing operations;

means interconnecting said transducing means and said media for synchronized relative movement to trace a signal path on said media between a first limit and a second limit of movement, said path comprising successive tracks, the arrangement being such that a track near said first limit of movement of said media comprises a first measured amount of signals while a track near said second limit of movement of said media comprises a measured amount of signals significantly shorter than said first measured amount; and measured review means for relatively moving said transducing means and said media a predetermined distance in a direction opposite to said preferred direction when said transducing means is near said first limit of movement of said media and an angular distance that is proportionally related to said predetermined angular distance and progressively greater the nearer said transducing means is to said second limit of movement of said media in order to establish review intervals that are of substantially comparable duration throughout the range of relative movement of said transducing means and said disc media.